(12) United States Patent
Li et al.

(10) Patent No.: US 12,472,575 B2
(45) Date of Patent: Nov. 18, 2025

(54) PROCESS FOR CONFORMAL PROCESSING OF CYLINDRICAL SHELL INNER WELD SEAM

(71) Applicant: DALIAN UNIVERSITY OF TECHNOLOGY, Liaoning (CN)

(72) Inventors: Te Li, Liaoning (CN); Tian Lan, Liaoning (CN); Haibo Liu, Liaoning (CN); Yuhang Ge, Liaoning (CN); Qile Bo, Liaoning (CN); Kuo Liu, Liaoning (CN); Xingjian Liu, Liaoning (CN); Xu Li, Liaoning (CN); Yongqing Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 601 days.

(21) Appl. No.: 17/981,126

(22) Filed: Nov. 4, 2022

(65) Prior Publication Data
US 2023/0191521 A1    Jun. 22, 2023

(30) Foreign Application Priority Data
Dec. 16, 2021  (CN) .......................... 202111540349.0

(51) Int. Cl.
*B23K 9/028*    (2006.01)
(52) U.S. Cl.
CPC ................... *B23K 9/0284* (2013.01)
(58) Field of Classification Search
CPC .. B23K 9/0284; B23K 26/244; B23K 26/323; B23K 2103/10; B23K 26/354
USPC .... 219/121.63, 121.64, 121.72, 66, 136, 119
See application file for complete search history.

(56) References Cited

U.S. PATENT DOCUMENTS

2009/0218325 A1\*   9/2009   Kreischer ........... B29C 65/1677
                                                                  138/155

FOREIGN PATENT DOCUMENTS

| CN | 103231293 A | 8/2013 |
|---|---|---|
| CN | 110421201 A | 11/2019 |

\* cited by examiner

*Primary Examiner* — Phuong T Nguyen
(74) *Attorney, Agent, or Firm* — MUNCY, GEISSLER, OLDS & LOWE, P.C.

(57) ABSTRACT

A process for conformal processing of a cylindrical shell inner weld seam by a special mobile robot includes using a laser scanner to scan a cylindrical shell inner weld seam to obtain point cloud data of a contour of a weld seam area first. Weld seam feature identification is carried out to each generatrix, and misidentified generatrices are filtered out to obtain weld seam left and right boundaries. An ideal weld seam processing contour is generated conformally according to the appearance of the weld seam area, weld seam coarse grinding is carried out after correction and compensation, and weld seam contour information after coarse grinding is obtained by scanning after the coarse grinding is completed. Process parameters of the grinding are controlled according to an actual weld seam contour, and weld seam fine grinding is carried out to obtain a smooth weld seam contour.

2 Claims, 2 Drawing Sheets

PROCESS FOR CONFORMAL PROCESSING OF CYLINDRICAL SHELL INNER WELD SEAM

TECHNICAL FIELD

The present invention belongs to the field of robot processing, and relates to a process method for conformal processing of a cylindrical shell inner weld seam by a special mobile robot, which can realize high-quality processing of a cylindrical shell inner weld seam by a special mobile robot.

BACKGROUND

Thin-walled cylindrical shells are often used as main body load carrying structural members in high-end equipment in key manufacturing fields such as aerospace, energy and power. Such components have excellent performances such as light weight and high structural specific strength, and are generally manufactured and shaped in the manners such as single-segment spinning, segmented processing and butt welding. After a welding process, and influenced by factors such as multi-segment butt misalignment and local thermal deformation during the welding process of a cylindrical shell, annular weld seams that are higher than the inner wall and have irregular shapes will be formed in the cylindrical shell. In general, as required by process requirements, high-quality precision processing need to be carried out to these weld seams to make the internal contour of the cylindrical shell smooth. However, due to the small diameter, large length and deformation of thin-walled structure of the cylindrical shell, it is very difficult to realize high-quality and controllable removal of reinforcement of a cylindrical shell inner weld seam. In actual production, it is necessary to enter the cylindrical shell by a worker with a small size, and use an angle grinder to manually grind and remove the weld seams; the working environment is very harsh, the labor intensity is high, and the processing quality is difficult to control. Existing processing equipment such as machine tools and industrial robots are limited by the size and structural stiffness thereof, and therefore it is difficult for such equipment to process annular weld seams far from the port of the cylindrical shell.

In 2013, "an inner weld seam grinding trolley" was disclosed by Hunan Xinzhong Industrial Equipment Co., Ltd. in a patent CN103231293A, which adopted a modular structure, and solved the problems of high labor intensity and complex installation and commissioning of existing equipment; this device is not automated, and still needs manual operation. In 2019, a "spiral tube inner wall weld seam grinding device" was disclosed by Donghua University in a patent CN110421201A; this grinding device can realize automatic grinding of spiral weld seams on the inner wall of a spiral tube, and has the advantages of good stability and high accuracy, but cannot realize conformal precision processing according to the contours of the weld seams. Therefore, it is necessary to explore a technical method that can realize precision processing of multipass weld seams in the cylindrical shell.

SUMMARY

To overcome the defects of the prior art, the present invention provides a process method for conformal processing of a cylindrical shell inner weld seam by a special mobile robot. In the method, a weld seam identification algorithm is designed to realize fast and accurate identification of the cylindrical shell inner weld seam, and thus to solve the problem of inaccurate and inefficient identification of inner weld seam contours; an ideal contour conformal generation method is proposed to realize high-quality and controllable removal of reinforcement of the cylindrical shell inner weld seam, and thus to solve the problem that the current grinding equipment is not adaptable and easy to damage the inner wall; a fine grinding process parameter control method is proposed, which can realize the control of a fine grinding process and ensure the consistency of weld seam processing quality. When applied to a special mobile robot, the method can realize high-efficiency and precision conformal processing of the cylindrical shell inner weld seam.

Figure 1:
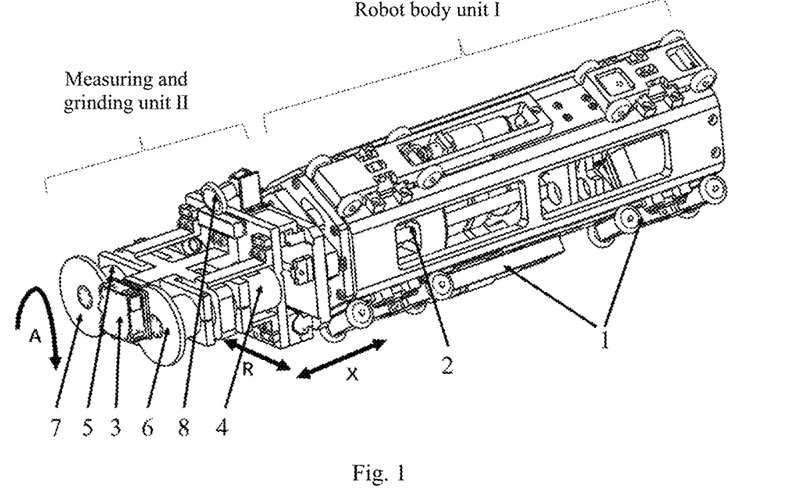

The present invention adopts the following technical solution: a process method for conformal processing of a cylindrical shell inner weld seam by a special mobile robot, wherein a special mobile robot used in the process method is composed of a robot body unit I and a measuring and grinding unit II; the robot body unit I is composed of motion and support mechanisms 1 and a three-axis drive mechanism 2; a total of 6 motion and support mechanisms 1 are provided, which are circumferentially and uniformly distributed at 120° intervals in a front row and a back row; a supporting force is provided by a cylinder to drive the robot to change diameter and support in a thin-walled cylindrical shell; motion and support mechanisms in the front row is equipped with a driving motor which outputs a driving force to drive the robot to walk in the cylindrical shell; the three-axis drive mechanism 2 is composed of an axial motor, a circumferential motor and a radial motor, and is used for driving the measuring and grinding unit II to move along an axial direction X, a rotating direction A and a radial direction R to meet the measurement and processing requirements of the robot in space;

The measuring and grinding unit II is composed of a laser scanner 3, an electric spindle for coarse grinding 4, an electric spindle for fine grinding 5, an arc grinding wheel 6, a flap wheel 7 and a wide-angle camera 8; the laser scanner 3 used for obtaining position and contour of the cylindrical shell inner weld seam is installed at the front end of the measuring and grinding unit II; the arc grinding wheel 6 is driven by the electric spindle for coarse grinding 4, and is used for carrying out coarse grinding to the inner weld seam, removing materials and reducing reinforcement of the inner weld seam; the flap wheel 7 is driven by the electric spindle for fine grinding 5, and is used for carrying out fine grinding to the inner weld seam, removing burrs and trimming shape of the contour of the inner weld seam; the wide-angle camera 8 used for observing the current position and processing condition of the robot is installed on one side of the measuring and grinding unit II.

A process method for conformal processing of a cylindrical shell inner weld seam by a special mobile robot, wherein in the method, a weld seam contour is scanned and measured to obtain point cloud data of a contour of a weld seam area first; then weld seam feature identification is carried out to each generatrix, and misidentified generatrices are filtered out to obtain weld seam left and right boundaries; an ideal weld seam processing contour is generated conformally according to the appearance of the weld seam area, and weld seam coarse grinding is carried out after correction and compensation; weld seam contour information after coarse grinding is obtained by scanning again after the coarse grinding is completed. Process parameters of the grinding are controlled according to an actual weld seam contour, weld seam fine grinding is carried out, and shape of an inner weld seam contour is trimmed to complete the conformal processing. The method comprises the following specific steps:

Step 1: First Weld Seam Contour Measurement and Feature Identification

Figure 4:
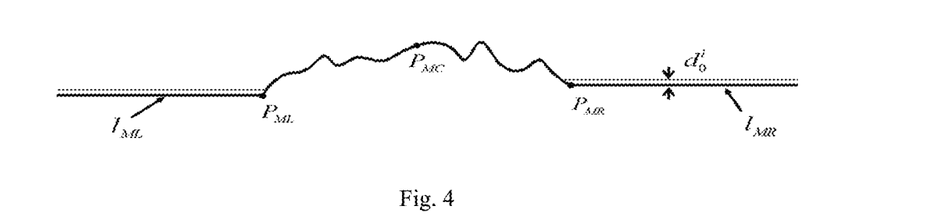
FIG. 4 is a schematic diagram of inner weld seam feature identification of a generatrix $K_M$. In the figure: $l_{ML}$—final left inner wall contour line; $l_{MR}$—final right inner wall contour line; $P_{ML}$—left feature point; $P_{MR}$—right feature point; $P_{MC}$—center feature point; $d_0^l$—threshold from point to inner wall contour line.

Putting a robot in a cylindrical shell, stopping the robot after the robot is judged to reach a weld seam according to a real-time image collected by a wide-angle camera 8, and using a laser scanner 3 to measure an annular weld seam area in the cylindrical shell; matching measurement data of the laser scanner 3 with position information of each kinematic axis of the three-axis drive mechanism 2 to obtain point cloud data of a contour of a cylindrical shell inner weld seam area; representing the obtained point cloud data as N generatrices ($K_1$, $K_2$, ... $K_N$) in an X-R plane in a cylindrical coordinate system (X-R-A coordinate system); then carrying out weld seam feature identification to each generatrix in the X-R plane; taking the $M^{th}$ generatrix $K_M$ as an example, selecting the leftmost m points $[(x_1, r_1), (x_2, r_2) \ldots (x_m, r_m)]$ within the range of the generatrix as initial points, and fitting a left inner wall contour line according to formula (1); starting from the $(u=m+1)^{th}$ leftmost point, calculating a distance $d_u^l$ from each point to the left inner wall contour line in sequence from left to right according to formula (2);

$$\begin{cases} r = ax + b \\ a = \dfrac{\sum_{i=1}^{n} x_i r_i - n\bar{x}\cdot\bar{r}}{\sum_{i=1}^{n} x_i^2 - n\bar{x}^2} \\ b = \bar{r} - a\bar{x} \end{cases} \quad (1)$$

Where, $(x_i, r_i)$ is a coordinate of a point involved in fitting, and n is the number of points involved in fitting; $\bar{x}$ is an x average value of the points involved in fitting; $\bar{r}$ is an r average value of the points involved in fitting; and $r=ax+b$ is the fitted inner wall contour line.

$$d_u^l = \frac{|ax_i - r_i + b|}{\sqrt{a^2 + 1}} \quad (2)$$

Where, $(x_i, r_i)$ is a point coordinate; and $r=ax+b$ is a straight-line formula.

Setting a threshold $d_0^l$ for judgement: if $d_u^l \leq d_0^l$, it is judged that a point u is still an inner wall contour point, re-fitting the left inner wall contour line by the leftmost u points, and letting u=u+1 to continue the judgement of a next data point; if $d_u^l > d_0^l$, and considering an error in identification, an actual weld seam feature point should be on the left side of point u; setting a compensation amount v (which is an integer of 5-12) according to the actual condition of the weld seam to carry out compensation, then the $(u-v)^{th}$ point is judged as a weld seam left feature point $P_{ML}$, the judgement cycle is ended, and a final left inner wall contour line is $l_{ML}$; similarly, fitting a right inner wall contour line by the rightmost points, and judging each point from right to left to obtain a weld seam right feature point $P_{MR}$ and a final right inner wall contour line $l_{MR}$; taking a middle point $P_{MC}$ the left and right feature points as a weld seam center feature point of the generatrices $K_M$, thus to obtain left feature points ($P_{1L}$, $P_{2L}$, ... $P_{NL}$), right feature points ($P_{1R}$, $P_{2R}$, ... $P_{NR}$), center feature points ($P_{1C}$, $P_{2C}$, ... $P_{NC}$), left inner wall contour lines ($l_{1L}$, $l_{2L}$, ... $l_{NL}$) and right inner wall contour lines ($l_{1R}$, $l_{2R}$, ... $l_{NR}$) of the generatrices;

Step 2: Filtering Out of Weld Seam Feature Misidentified Generatrices Caused by Debris and Oil Stains Completing weld seam feature point identification of each generatrix in sequence, and filtering out weld seam feature misidentified generatrices; taking the $M^{th}$ generatrix $K_M$ as an example, and obtaining weld seam width by calculation from left and right weld seam feature points $P_{ML}(x_{PML}, r_{PML})$ and $P_{MR}(x_{PMR}, r_{PMR})$ of the generatrix according to formula (3).

$$w_M = x_{PMR} - x_{PML} \quad (3)$$

Setting the minimum weld width $w_{min}$ and the maximum weld width $w_{max}$ according to actual inner weld seam features, and judging generatrices with $w_M > w_{max}$ and $w_M < w_{min}$ as weld seam width identification abnormal generatrices;

In a rectangular coordinate system, fitting a plane $L_T$ by the weld seam center feature points ($P_{1C}$, $P_{2C}$, ... $P_{NC}$) of various generatrices according to formula (4), and calculating a distance $d_M^f$ from a weld seam center feature point $P_{MC}$ of the generatrix $K_M$ to the plane $L_T$ according to formula (5);

$$\begin{cases} Ax + By + Cz + D = 0, (C \neq 0) \\ \begin{vmatrix} \sum x_i^2 & \sum x_i y_i & \sum x_i \\ \sum x_i y_i & \sum y_i^2 & \sum y_i \\ \sum x_i & \sum y_i & n \end{vmatrix} \begin{pmatrix} a_0 \\ a_1 \\ a_2 \end{pmatrix} = \begin{pmatrix} \sum x_i z_i \\ \sum y_i z_i \\ \sum z_i \end{pmatrix} \end{cases} \quad (4)$$

where, $$a_0 = -\frac{A}{C}, a_1 = -\frac{B}{C}, a_2 = -\frac{D}{C}$$

Where, $Ax+By+Cz+D=0$ is a plane generated by fitting; n is the quantity of the points involved in fitting; and ($x_i$, $y_i$, $z_i$) is a three-dimensional coordinate of a point involved in fitting.

$$d^f = \frac{|Ax_i + By_i + Cz_i + D|}{\sqrt{A^2 + B^2 + C^2}} \quad (5)$$

Where, $d^f$ is a distance from a point to a plane; ($x_i$, $y_i$, $z_i$) is a point coordinate; and $Ax+By+Cz+D=0$ is a plane formula.

Setting a threshold for a distance $d_0^f$ from a weld seam center point to a fitted plane, and judging a generatrix with $d_M^f > d_0^f$ as a weld seam position identification abnormal generatrix; filtering out weld seam feature misidentified generatrices by the above two judgement methods, with the remaining Z qualified generatrices being ($K_1'$, $K_2'$, ... $K_Z'$).

Step 3: Obtaining of Maximum Boundary of Weld Seam

Fitting a weld seam center plane $L_c$ by inner weld seam center feature points ($P_{1C}'$, $P_{2C}'$, ... $P_{ZC}'$) of the remaining Z qualified generatrices ($K_1'$, $K_2'$, ... $K_Z'$), and calculating distances ($d_{1L}'$, $d_{2L}'$, ... $d_{ZL}'$) from left feature points ($P_{1L}'$, $P_{2L}'$, ... $P_{ZL}'$) of the qualified generatrices to the weld seam center plane $L_c$ according to formula (5); taking the maximum distance $d_L' = \max(d_{1L}', d_{2L}', \ldots d_{ZL}')$, and generating a parallel surface $L_l$ at a distance $d_L'$ from the left side of the weld seam center plane $L_c$, namely a weld seam left boundary plane $L_l$; obtaining a weld seam right boundary plane $L_r$ in a similar way; finally, in a three-dimensional coordinate system, calculating intersection points of the left inner wall contour lines ($l_{1L}, l_{2L}, \ldots l_{NL}$) and the weld seam left boundary plane $L_l$ in all of the Ngeneratrices ($K_1, K_2, \ldots K_N$), namely weld seam left boundary points ($T_{1L}, T_{2L}, \ldots T_{NL}$) of the generatrices; obtaining weld seam right boundary points ($T_{1R}, T_{2R}, \ldots T_{NR}$) of the generatrices in a similar way; thus, obtaining of maximum boundary of inner weld seam is completed;

Step 4: Ideal Weld Seam Contour Conformal Generation and Coarse Grinding

Figure 5:
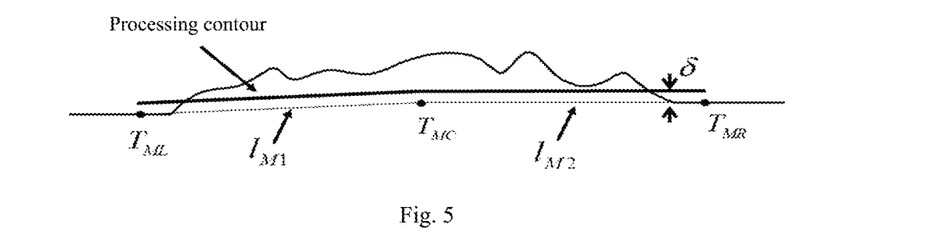
FIG. 5 is a schematic diagram of ideal weld seam contour generation of a generatrix $K_M$. In the figure: $T_{ML}$—left boundary point; $T_{MR}$—left boundary point; $T_{MC}$—middle point; $l_{M1}$—connecting line between point $T_{ML}$ and point $T_{MC}$, $l_{M2}$—connecting line between point $T_{MC}$ and point $T_{MR}$, and $l_{M1}$ and $l_{M2}$ also form an ideal weld seam contour of the generatrix; δ—safe distance.

After obtaining of maximum boundary of weld seam is completed, conformally generating an ideal weld seam contour, and carrying out coarse processing; taking the $M^{th}$ generatrix $K_M$ as an example, and calculating a middle position $x_{TMC}=(x_{TML}+x_{TMR})/2$ of a left boundary point $T_{ML}$ ($x_{TML}$, $r_{TML}$) and a right boundary point $T_{MR}$ ($x_{TMR}$, $r_{TMR}$); calculating a point ($x_{TMC}$, $r_1$) of the left inner wall contour line $l_{ML}$ at the middle position and a point ($x_{TMC}$, $r_2$) of the right inner wall contour line $l_{MR}$ at the middle position; considering the influence of seam misalignment during cylindrical shell welding, and comparing the point heights $r_1$ and $r_2$ the left and right inner wall contour lines $l_{ML}$ and $l_{MR}$ at the middle position; if $r_1>r_2$, it is judged that the left inner wall is higher than the right inner wall in the generatrix, and the coordinate of a middle point $T_{MC}$ is ($x_{TMC}$, $r_1$); if $r_1 \leq r_2$, it is judged that the right inner wall is higher than the left inner wall in the generatrix, and the coordinate of the middle point $T_{MC}$ is ($x_{TMC}$, $r_2$); connecting the three points $T_{ML}$, $T_{MC}$ and $T_{MR}$, wherein $l_{M1}$ is a connecting line between the point $T_{ML}$ and the point $T_{MC}$, $l_{M2}$ is a connecting line between the point $T_{MC}$ and the point $T_{MR}$, and $l_{M1}$ and $l_{M2}$ and form the ideal weld seam contour of the generatrix, which is represented by formula (6).

$$r = \begin{cases} a_{M1}x + b_{M1} & (x < x_{TMC}) \\ a_{M2}x + b_{M2} & (x \geq x_{TMC}) \end{cases} \quad (6)$$

Where, $r=a_{M1}x+b_{M1}$ and $r_{M2}=a_{M2}x+b_{M2}$ are respectively expressions of $l_{M1}$ and $l_{M2}$; and $x_{TMC}$ is the middle position of the left and right boundaries.

Due to errors in robot processing, and in order to avoid damage to the inner wall, generating a processing contour parallel to the ideal weld seam contour at a certain safe distance $\delta$ upward; discretizing the processing contour into processing points, generating a G code, and carrying out coarse grinding to a cylindrical shell inner weld seam;

Step 5: Second Weld Seam Contour Measurement and Fine Grinding Parameter Control After the coarse grinding is completed, using the laser scanner 3 to scan again, and changing the dwell time of a flap wheel to realize grinding amount control of each part of the weld seam and realize weld seam fine grinding. First, obtaining contours after coarse grinding of generatrices ($K_1$, $K_2, \ldots K_N$) by laser scanner scanning Generating a grinding track of the flap wheel 7 according to ideal weld seam middle points ($T_{1C}, T_{2C}, \ldots T_{NC}$) of various generatrices in a three-dimensional space.

Taking the $M^{th}$ generatrix $K_M$ as an example, setting a variable contour difference $\xi_M$ to represent the difference between the weld seam contour after coarse grinding and the ideal weld seam contour of the generatrix $K_M$, and calculating a distance $d_{Mi}$ from each point in the weld seam area to an ideal weld seam according to formula (7);

$$\begin{cases} d_{Mi} = \begin{cases} r - (a_{M1}x - b_{M1}), & x_{TML} \leq x \leq x_{TMC} \\ r - (a_{M2}x - b_{M2}), & x_{TMC} < x \leq x_{TMR} \end{cases}, \text{ where } i=1,2\ldots n \\ \xi_M = \dfrac{\sum_1^n d_{Mi}}{n} \end{cases} \quad (7)$$

Where, $\xi_M$ represents a weld seam contour difference of the generatrix $K_M$; n represents the quantity of points in the weld seam area of the generatrix; and $d_{Mi}$ represents a distance from an actual weld seam contour point to the ideal weld seam contour;

As the flap wheel is flexible, when used for processing the generatrix $K_M$, the flap wheel will also have a grinding influence on the area around the generatrix $K_M$. Therefore, a grinding weight $\mu_i$ is introduced to represent the grinding action of the flap wheel on the weld beam of various generatrices when used for grinding at the generatrix $K_M$. When the flap wheel is used for grinding at the generatrix $K_M$, the generatrix $K_M$ is most influenced by cutting, the value of corresponding $\mu_0$ is the largest, and the weight $\mu_i$ of each nearby generatrix is determined according to the degree of influence. Obtaining a weld seam grinding dwell time coefficient $\psi_M$ at $K_M$ by weighted calculation of the weld seam contour difference $\xi_i$ of each generatrix according to formula (8):

$$\psi_M = \frac{\mu_0 \xi_M + \mu_1(\xi_{M-1} + \xi_{M+1}) + \mu_2(\xi_{M-2} + \xi_{M+2}) + \ldots + \mu_n(\xi_{M-n} + \xi_{M+n})}{\mu_0 + 2\mu_1 + 2\mu_2 + \ldots + 2\mu_n} \quad (8)$$

Where, $\psi_M$ represents the grinding dwell time coefficient at the generatrix $K_M$; $\mu_i$ represents the grinding weight; and $\xi_i$ represents the weld seam contour difference of the generatrix $K_M$;

Finally, obtaining the dwell time $t_M$ of flap wheel grinding at the generatrix $K_M$ according to formula (9).

$$t_M = \psi_M t_0 \quad (9)$$

Where, $t_0$ represents unit dwell time; $\psi_M$ represents the dwell time coefficient; and $t_M$ represents the dwell time at the generatrix $K_M$.

Similarly, calculating the dwell time ($t_1, t_2, \ldots t_N$) at the generatrices ($K_1, K_2, \ldots K_N$), generating a G code, and carrying out fine grinding to the weld seam area to complete the conformal processing of the cylindrical shell inner weld seam.

The present invention has the following beneficial effects: the present invention realizes conformal processing of a cylindrical shell inner weld seam by a special mobile robot through a measurement-processing integrated process method, and solves the problem of automatic processing of an inner weld seam of a deep cavity thin-walled cylindrical shell in key fields. In the method, a weld seam identification algorithm is proposed, which realizes fast and accurate identification of a cylindrical shell inner weld seam; an ideal weld seam contour generation method is proposed to conformally generate a processing contour according to an inner weld seam contour, which removes reinforcement of the inner weld seam and avoids damage to the inner wall of the cylindrical shell. A fine grinding process parameter control method is proposed, which realizes the control of a fine grinding process and ensures the consistency of weld seam processing quality. The process method for conformal processing of an inner weld seam has been applied to a special mobile robot, which realizes automatic precision processing of various types of cylindrical shell inner weld seams and improves overall processing efficiency and processing quality of the robot.

DESCRIPTION OF DRAWINGS

FIG. 1 is a structural schematic diagram of a special processing robot. In the figure: 1—motion and support mechanisms; 2—three-axis drive mechanism; 3—laser scanner; 4—electric spindle for coarse grinding; 4—electric spindle for fine grinding; 6—arc grinding wheel; 7—flap wheel; 8—wide-angle camera.

FIG. 3a) is a point cloud chart of a contour of a cylindrical shell inner weld seam area, and FIG. 3b) is a local enlarged view.

DETAILED DESCRIPTION

Detailed description of the present invention is described below in detail in combination with drawings and the technical solution.

A working flow of a special mobile robot is as follows: putting a robot in a cylindrical shell, making the robot crawl towards a welded area of the cylindrical shell, stopping the robot after the robot is judged to reach a weld seam according to a real-time image collected by a wide-angle camera 8, exerting forces and supporting tightly by motion and support mechanisms 1 to ensure that the robot and the shell are relatively static, thus a robot motion tracking process is completed, and starting measurement and processing of a cylindrical shell inner weld seam by a three-axis drive mechanism 2 in combination with a measuring and grinding unit II.

Figure 3:
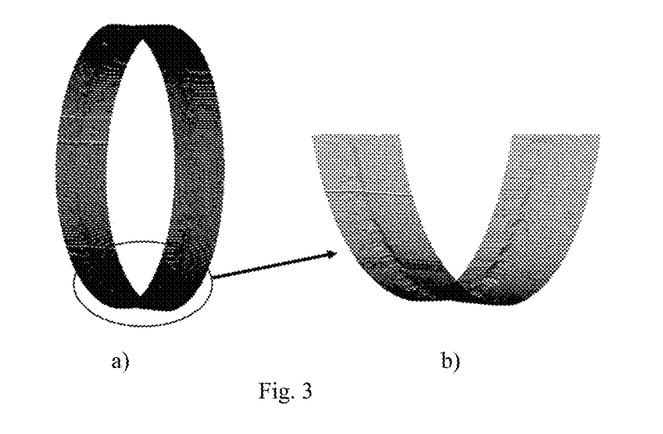

FIG. 3 is a point cloud chart of a contour of a cylindrical shell inner weld seam area. The special mobile robot is used for precision processing of a cylindrical shell inner weld seam with a diameter of 400 mm, a thickness of 2 mm, a distance to port of 2.1 m and a width of about 6 mm.

A structure of the special mobile robot is shown in FIG. 1, and the special mobile robot is composed of a robot body unit I and the measuring and grinding unit II. The robot body unit I is composed of the motion and support mechanisms 1 and the three-axis drive mechanism 2; a total of 6 motion and support mechanisms 1 are provided, which are circumferentially and uniformly distributed at 120° intervals in a front row and a back row; a supporting force is provided by a cylinder to drive the robot to change diameter and support in the cylindrical shell. Motion and support mechanisms in the front row is equipped with a driving motor which outputs a driving force to drive the robot to walk in the cylindrical shell. The three-axis drive mechanism 2 is composed of an axial motor, a circumferential motor and a radial motor, and can be used for driving the measuring and grinding unit II to move along an axial direction X, a rotating direction A and a radial direction R to meet the measurement and processing requirements of the robot in space.

The measuring and grinding unit II is composed of a laser scanner 3, an electric spindle for coarse grinding 4, an electric spindle for fine grinding 5, an arc grinding wheel 6, a flap wheel 7 and the wide-angle camera 8. The laser scanner 3 is installed at the forefront of the measuring and grinding unit II and is used for obtaining position and contour of the cylindrical shell inner weld seam. The arc grinding wheel 6 is driven by the electric spindle for coarse grinding 4, and is used for carrying out coarse grinding to the inner weld seam, removing materials and reducing reinforcement of the inner weld seam. The flap wheel 7 is driven by the electric spindle for fine grinding 5, and is used for carrying out fine grinding to the inner weld seam, removing burrs and trimming shape of the contour of the inner weld seam. The wide-angle camera 8 is installed on one side of the measuring and grinding unit II, and is used for observing the current position and processing condition of the robot.

Figure 2:
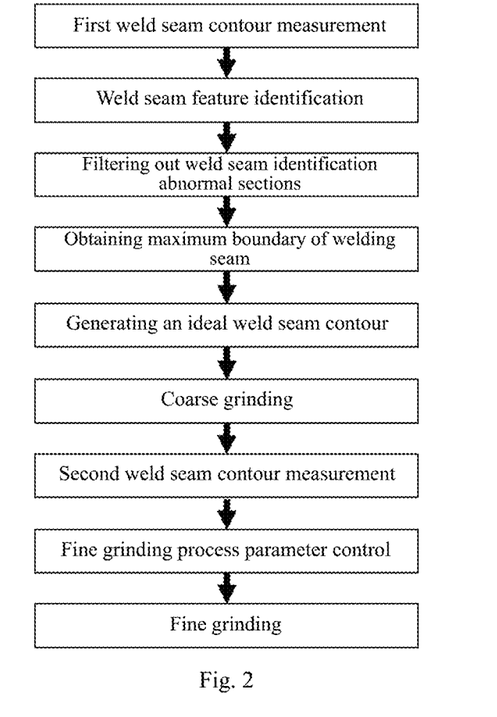
FIG. 2 is a flow chart of a process method for conformal processing of a cylindrical shell inner weld seam.

FIG. 2 is a flow chart of a process method for conformal processing of a cylindrical shell inner weld seam. In the method, a weld seam contour is scanned and measured to obtain point cloud data of a contour of a weld seam area first; then weld seam feature identification is carried out to each generatrix, and misidentified generatrices are filtered out to obtain weld seam left and right boundaries; an ideal weld seam processing contour is generated conformally according to the appearance of the weld seam area, and weld seam coarse grinding is carried out after correction and compensation; weld seam contour information after coarse grinding is obtained by scanning again after the coarse grinding is completed. Process parameters of the grinding are controlled according to an actual weld seam contour, weld seam fine grinding is carried out, and shape of an inner weld seam contour is trimmed to complete the conformal processing. The method comprises the following specific implementation steps:

Step 1: Weld Seam Contour Measurement and Feature Identification

First, driving the laser scanner 3 of the measuring and grinding unit II to measure an annular weld seam area in the cylindrical shell by rotation of the three-axis drive mechanism 2 of the robot along a direction A in FIG. 1. Matching measurement data of the laser scanner 3 with position information of each kinematic axis of the three-axis drive mechanism 2 to obtain point cloud data of a contour of a cylindrical shell inner weld seam area. Representing the obtained point cloud data as 1440 generatrices ($K_1$, $K_2$, ... $K_{1440}$) in an X-R plane in a cylindrical coordinate system (X-R-A coordinate system).

Carrying out weld seam feature identification to each generatrix in the X-R plane, as shown in FIG. 4. Taking the $M^{th}$ generatrix $K_M$ as an example, selecting the leftmost 40 points [$(x_1, r_1), (x_2, r_2) \ldots (x_{40}, r_{40})$] within the range of the generatrix as initial points, and fitting a left inner wall contour line according to formula (1). Starting from the $(u=41)^{th}$ leftmost point, calculating a distance $d_u^l$ from each point to the left inner wall contour line from left to right according to formula (2).

Setting a threshold $d_0^l = 0.08$ mm for judgement: if $d_u^l \leq d_0^l$, it is judged that a point u is still an inner wall contour point, re-fitting the left inner wall contour line by the leftmost u points, and letting u=u+1 to continue the judgement of a next data point; if $d_u^l \le d_0^l$, and considering an error in identification, an actual weld seam feature point should be on the left side of point u; setting a compensation amount v=6 to carry out compensation, then the $(u-6)^{th}$ point is judged as a weld seam left feature point $P_{ML}$, the judgement cycle is ended, and a final left inner wall contour line is $l_{ML}$. Similarly, fitting a right inner wall contour line by the rightmost points, and judging each point from right to left to obtain a weld seam right feature point $P_{MR}$ and a final right inner wall contour line $l_{MR}$. Taking a middle point $P_{MC}$ of the left and right feature points as a weld seam center feature point of the generatrices $K_M$. Based on such method, left feature points $(P_{1L}, P_{2L}, \ldots P_{1440L})$, right feature points $(P_{1R}, P_{2R}, \ldots P_{1440R})$, center feature points $(P_{1C}, P_{2C}, \ldots P_{1440C})$, left inner wall contour lines $(l_{1L}, l_{2L}, \ldots l_{1440L})$ and right inner wall contour lines $(l_{1R}, l_{2R}, \ldots l_{1440R})$ of the generatrices can be obtained.

Step 2: Filtering Out of Weld Seam Feature Misidentified Generatrices Caused by Debris and Oil Stains Completing weld seam feature point identification of each generatrix in sequence, and filtering out weld seam feature misidentified generatrices. Taking the $M^{th}$ generatrix $K_M$ as an example, and obtaining weld seam width by calculation from left and right weld seam feature points $P_{ML}$ ($x_{PML}$, $r_{PML}$) and $P_{MR}$ ($x_{PMR}$, $r_{PMR}$) of the generatrix according to formula (3).

Setting the minimum weld width $w_{min}=4$ mm and the maximum weld width $w_{max}=8$ mm according to actual inner weld seam features, and judging generatrices with $w_M > w_{max}$ and $w_M < w_{min}$ as weld seam width identification abnormal generatrices. In a rectangular coordinate system, fitting a plane $L_T$ by the weld seam center feature points $(P_{1C}, P_{2C}, \ldots P_{1440C})$ of various generatrices according to formula (4), and calculating a distance $d_M^f$ from a weld seam center feature point $P_{MC}$ of the generatrix $K_M$ to the plane $L_T$ according to formula (5). Setting a threshold for a distance $d_0^f=1.5$ mm from a weld seam center point to a fitted plane, and judging a generatrix with $d_M^f > d_0^f$ as a weld seam position identification abnormal generatrix. Filtering out weld seam feature misidentified generatrices by the above two judgement methods.

Step 3: Obtaining of Maximum Boundary of Weld Seam

After filtering out of misidentified generatrices is completed, obtaining maximum boundary of weld seam. Fitting a weld seam center plane $L_c$ by inner weld seam center feature points $(P_{1C}', P_{2C}', \ldots P_{1380C}')$ of the remaining 1380 qualified generatrices $(K_1', K_2', \ldots K_{1380}')$, and calculating distances $(d_{1L}', d_{2L}', \ldots d_{1380L}')$ from left feature points $(P_{1L}', P_{2L}', \ldots P_{1380L}')$ of the qualified generatrices to the weld seam center plane $L_c$ according to formula (5). Taking the maximum distance $d_L'=\max(d_{1L}', d_{2L}', \ldots P_{1380L}')$, and generating a parallel surface $L_l$ at a distance $d_L'$ from the left side of the weld seam center plane $L_c$, namely a weld seam left boundary plane. Obtaining a weld seam right boundary plane $L_r$ in a similar way. Finally, in a three-dimensional coordinate system, calculating intersection points of the left inner wall contour lines $(l_{1L}, l_{2L}, \ldots l_{1440L})$ and the weld seam left boundary plane $L_l$ in all of the 1440 generatrices $(K_1, K_2, \ldots K_{1440})$, namely weld seam left boundary points $(T_{1L}, T_{2L}, \ldots T_{1440L})$ of the generatrices. Obtaining weld seam right boundary points $(T_{1R}, T_{2R}, \ldots T_{1440R})$ of the generatrices in a similar way. Thus, obtaining of maximum boundary of inner weld seam is completed.

Step 4: Ideal Weld Seam Contour Conformal Generation and Coarse Grinding

After obtaining of maximum boundary of weld seam is completed, conformally generating an ideal weld seam contour, and carrying out coarse processing. As shown in FIG. 5, taking the $M^{th}$ generatrix $K_M$ as an example, and calculating a middle position $x_{TMC}=(x_{TML}+x_{TMR})/2$ of a left boundary point $T_{ML}$ ($x_{TML}$, $r_{TML}$) and a right boundary point $T_{MR}$ ($x_{TMR}$, $r_{TMR}$). Calculating a point ($x_{TMC}$, $r_1$) of the left inner wall contour line $l_{ML}$ at the middle position and a point ($x_{TMC}$, $r_2$) of the right inner wall contour line $l_{MR}$ at the middle position. Considering the influence of seam misalignment during cylindrical shell welding, and comparing the point heights $r_1$ and $r_2$ the left and right inner wall contour lines $l_{ML}$ and $l_{MR}$ at the middle position; if $r_1 > r_2$, it is judged that the left inner wall is higher than the right inner wall in the generatrix, and the coordinate of a middle point $T_{MC}$ is ($x_{TMC}$, $r_1$). Connecting the three points $T_{ML}$, $T_{MC}$ and $T_{MR}$, wherein $l_{M1}$ is a connecting line between the point $T_{ML}$ and the point $T_{MC}$, $l_{M2}$ is a connecting line between the point $T_{MC}$ and the point $T_{MR}$, and $l_{M1}$ and $l_{M2}$ form the ideal weld seam contour of the generatrix, which is represented by formula (6).

Due to errors in robot processing, and in order to avoid damage to the inner wall, generating a processing contour parallel to the ideal weld seam contour at a certain safe distance $\delta=0.1$ mm upward. Discretizing the processing contour into processing points, generating a G code, and carrying out conformal coarse grinding to a cylindrical shell inner weld seam.

Figure 6:
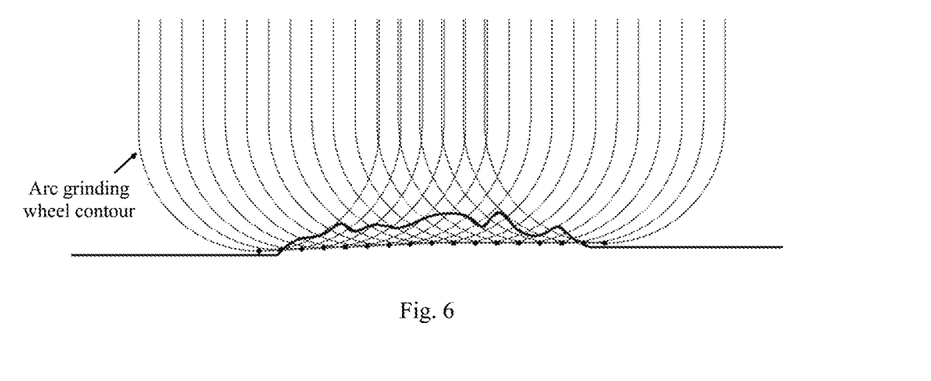
FIG. 6 is a schematic diagram of conformal processing of an inner weld seam.

Step 5: Second Weld Seam Contour Measurement and Fine Grinding Parameter Control After the coarse grinding is completed, using the laser scanner 3 to scan again, and changing the dwell time of a flap wheel to realize grinding amount control of each part of the weld seam and realize weld seam fine grinding. First, obtaining contours after coarse grinding of generatrices $(K_1, K_2, \ldots K_{1440})$ by laser scanner scanning. Generating a grinding track of the flap wheel 7 according to ideal weld seam middle points $(T_{1C}, T_{2C}, \ldots T_{1440C})$ of various generatrices in a three-dimensional space. Taking the $M^{th}$ generatrix $K_M$ as an example, setting a variable contour difference $\xi_M$ to represent the difference between the weld seam contour after coarse grinding and the ideal weld seam contour of the generatrix $K_M$, and calculating a distance from each point in the weld seam area to an ideal weld seam according to formula (7). As the flap wheel is flexible, when used for processing the generatrix $K_M$, the flap wheel will have a grinding influence on nearby generatrices $(K_{M-4}, \ldots K_{M-1}, K_{M+1}, \ldots K_{M+4})$. Therefore, a grinding weight $\mu_i$ is introduced to represent the grinding action of the flap wheel on the weld beam of various generatrices when used for grinding at the generatrix $K_M$. Weights $\mu_0=8$, $\mu_1=5$, $\mu_2=4$, $\mu_3=3$, $\mu_4=1$. Obtaining a weld seam grinding dwell time coefficient $\psi_M$ at $K_M$ by weighted calculation of the weld seam contour difference $\xi_i$ of each generatrix according to formula (8). Finally, obtaining the dwell time $t_M$ of flap wheel grinding at the generatrix $K_M$ according to formula (9). Similarly, calculating the dwell time $(t_1, t_2, \ldots t_{1440})$ at the generatrices $(K_1, K_2, \ldots K_{1440})$, generating a G code, and carrying out fine grinding to the weld seam area to complete the conformal processing of the cylindrical shell inner weld seam.

The process method for conformal processing of a cylindrical shell inner weld seam by a special mobile robot of the present invention realizes conformal processing of a cylindrical shell inner weld seam by a special mobile robot, and improves the processing efficiency and quality of the cylindrical shell inner weld seam.

The invention claimed is:

1. A method for conformal processing of a cylindrical shell inner weld seam by a special mobile robot, wherein in the method, a weld seam contour is scanned and measured to obtain point cloud data of a contour of a weld seam area first; then weld seam feature identification is carried out to each generatrix, and misidentified generatrices are filtered out to obtain weld seam left and right boundaries; an ideal weld seam processing contour is generated conformally according to the appearance of the weld seam area, and weld seam coarse grinding is carried out after correction and compensation; weld seam contour information after coarse grinding is obtained by scanning again after the coarse grinding is completed; process parameters of the grinding are controlled according to an actual weld seam contour, weld seam fine grinding is carried out, and shape of an inner weld seam contour is trimmed to complete the conformal processing; and the method comprises the following specific steps:

step 1: first weld seam contour measurement and feature identification putting a robot in a cylindrical shell, stopping the robot after the robot is judged to reach a weld seam according to a real-time image collected by a wide-angle camera, and using a laser scanner to measure an annular weld seam area in the cylindrical shell; matching measurement data of the laser scanner with position information of each kinematic axis of a three-axis drive mechanism to obtain point cloud data of a contour of a cylindrical shell inner weld seam area; representing the obtained point cloud data as N generatrices ($K_1$, $K_2$, ... $K_N$) in an X-R plane in a cylindrical coordinate system (X-R-A coordinate system); then carrying out weld seam feature identification to each generatrix in the X-R plane; taking the $M^{th}$ generatrix $K_M$ as an example, selecting the leftmost m points [($x_1$, $r_1$), ($x_2$, $r_2$) ... ($x_m$, $r_m$)] within the range of the generatrix as initial points, and fitting a left inner wall contour line according to formula (1); starting from the (u=m+1)$^{th}$ leftmost point, calculating a distance $d_u^l$ from each point to the left inner wall contour line in sequence from left to right according to formula (2);

$$\begin{cases} r = ax + b \\ a = \dfrac{\sum_{i=1}^{n} x_i r_i - n\bar{x} \cdot \bar{r}}{\sum_{i=1}^{n} x_i^2 - n\bar{x}^2} \\ b = \bar{r} - a\bar{x} \end{cases} \quad (1)$$

where, ($x_i$, $r_i$) is a coordinate of a point involved in fitting, and n is the number of points involved in fitting; $\bar{x}$ is an x average value of the points involved in fitting; $\bar{r}$ is an r average value of the points involved in fitting; and r=ax+b is the fitted inner wall contour line;

$$d_u^l = \dfrac{|ax_i - r_i + b|}{\sqrt{a^2 + 1}} \quad (2)$$

where, ($x_i$, $r_i$) is a point coordinate; and r=ax+b is a straight-line formula;

setting a threshold $d_0^l$ for judgement: if $d_u^l \leq d_0^l$, it is judged that a point u is still an inner wall contour point, re-fitting the left inner wall contour line by the leftmost u points, and letting u=u+1 to continue the judgement of a next data point; if $d_u^l > d_0^l$, and considering an error in identification, an actual weld seam feature point should be on the left side of point u; setting a compensation amount v (which is an integer of 5-12) according to the actual condition of the weld seam to carry out compensation, then the (u-v)$^{th}$ point is judged as a weld seam left feature point $P_{ML}$, the judgement cycle is ended, and a final left inner wall contour line is $l_{ML}$; similarly, fitting a right inner wall contour line by the rightmost points, and judging each point from right to left to obtain a weld seam right feature point $P_{MR}$ and a final right inner wall contour line $l_{MR}$; taking a middle point $P_{MC}$ of the left and right feature points as a weld seam center feature point of the generatrices $K_M$, thus to obtain left feature points ($P_{1L}$, $P_{2L}$, ... $P_{NL}$), right feature points ($P_{1R}$, $P_{2R}$, ... $P_{NR}$), center feature points ($P_{1C}$, $P_{2C}$, ... $P_{NC}$), left inner wall contour lines ($l_{1L}$, $l_{2L}$, ... $l_{NL}$) and right inner wall contour lines ($l_{1R}$, $l_{2R}$, ... $l_{NR}$) of the generatrices;

step 2: filtering out of weld seam feature misidentified generatrices caused by debris and oil stains completing weld seam feature point identification of each generatrix in sequence, and filtering out weld seam feature misidentified generatrices; taking the $M^{th}$ generatrix $K_M$ as an example, and obtaining weld seam width by calculation from left and right weld seam feature points $P_{ML}$ ($x_{PML}$, $r_{PML}$) and $P_{MR}$ ($x_{PMR}$, $r_{PMR}$) of the generatrix according to formula (3);

$$w_M = x_{PMR} - x_{PML} \quad (3)$$

setting the minimum weld width $w_{min}$ and the maximum weld width $w_{max}$ according to actual inner weld seam features, and judging generatrices with $w_M > w_{max}$ and $w_M < w_{min}$ as weld seam width identification abnormal generatrices;

in a rectangular coordinate system, fitting a plane $L_T$ by the weld seam center feature points ($P_{1C}$, $P_{2C}$, ... $P_{NC}$) of various generatrices according to formula (4), and calculating a distance $d_M^f$ from a weld seam center feature point $P_{MC}$ of the generatrix $K_M$ to the plane $L_T$ according to formula (5);

$$\begin{cases} Ax + By + Cz + D = 0, (C \neq 0) \\ \begin{vmatrix} \sum x_i^2 & \sum x_i y_i & \sum x_i \\ \sum x_i y_i & \sum y_i^2 & \sum y_i \\ \sum x_i & \sum y_i & n \end{vmatrix} \begin{pmatrix} a_0 \\ a_1 \\ a_2 \end{pmatrix} = \begin{pmatrix} \sum x_i z_i \\ \sum y_i z_i \\ \sum z_i \end{pmatrix} \end{cases} \quad (4)$$

where, $$a_0 = -\dfrac{A}{C}, a_1 = -\dfrac{B}{C}, a_2 = -\dfrac{D}{C}$$

where, Ax+By+Cz+D=0 is a plane generated by fitting; n is the quantity of the points involved in fitting; and ($x_i$, $y_i$, $z_i$) is a three-dimensional coordinate of a point involved in fitting;

$$d^f = \dfrac{|Ax_i + By_i + Cz_i + D|}{\sqrt{A^2 + B^2 + C^2}} \quad (5)$$

where, $d^f$ is a distance from a point to a plane; $(x_i, y_i, z_i)$ is a point coordinate; and $Ax+By+Cz+D=0$ is a plane formula;

setting a threshold for a distance $d_0^f$ from a weld seam center point to a fitted plane, and judging a generatrix with $d_M^f > d_0^f$ as a weld seam position identification abnormal generatrix; filtering out weld seam feature misidentified generatrices by the above two judgement methods, with the remaining Z qualified generatrices being $(K_1', K_2', \ldots K_Z')$;

step 3: obtaining of maximum boundary of weld seam fitting a weld seam center plane $L_c$ by inner weld seam center feature points $(P_{1C}', P_{2C}', \ldots P_{ZC}')$ of the remaining Z qualified generatrices $(K_1', K_2', \ldots K_Z')$, and calculating distances $(d_{1L}', d_{2L}', \ldots d_{ZL}')$ from left feature points $(P_{1L}', P_{2L}', \ldots P_{ZL}')$ of the qualified generatrices to the weld seam center plane $L_c$ according to formula (5); taking the maximum distance $d_L' = \max(d_{1L}', d_{2L}', \ldots d_{ZL}')$, and generating a parallel surface $L_l$ at a distance $d_L'$ from the left side of the weld seam center plane $L_c$, namely a weld seam left boundary plane; obtaining a weld seam right boundary plane $L_r$ in a similar way; finally, in a three-dimensional coordinate system, calculating intersection points of the left inner wall contour lines $(l_{1L}, l_{2L}, \ldots l_{NL})$ and the weld seam left boundary plane $L_l$ in all of the Ngeneratrices $(K_1, K_2, \ldots K_N)$, namely weld seam left boundary points $(T_{1L}, T_{2L}, \ldots T_{NL})$ of the generatrices; obtaining weld seam right boundary points $(T_{1R}, T_{2R}, \ldots T_{NR})$ of the generatrices in a similar way; thus, obtaining of maximum boundary of inner weld seam is completed;

step 4: ideal weld seam contour conformal generation and coarse grinding after obtaining of maximum boundary of weld seam is completed, conformally generating an ideal weld seam contour, and carrying out coarse processing; taking the $M^{th}$ generatrix $K_M$ as an example, and calculating a middle position $x_{TMC} = (x_{TML} + x_{TMR})/2$ of a left boundary point $T_{ML}(x_{TML}, r_{TML})$ and a right boundary point $T_{MR}(x_{TMR}, r_{TMR})$; calculating a point $(x_{TMC}, r_1)$ of the left inner wall contour line $l_{ML}$ at the middle position and a point $(x_{TMC}, r_2)$ of the right inner wall contour line $l_{MR}$ at the middle position; considering the influence of seam misalignment during cylindrical shell welding, and comparing the point heights $r_1$ and $r_2$ the left and right inner wall contour lines $l_{ML}$ and $l_{MR}$ at the middle position; if $r_1 > r_2$, it is judged that the left inner wall is higher than the right inner wall in the generatrix, and the coordinate of a middle point $T_{MC}$ is $(x_{TMC}, r_1)$; if $r_1 \leq r_2$, it is judged that the right inner wall is higher than the left inner wall in the generatrix, and the coordinate of the middle point $T_{MC}$ is $(x_{TMC}, r_2)$; connecting the three points $T_{ML}, T_{MC}$ and $T_{MR}$, wherein $l_{M1}$ is a connecting line between the point $T_{ML}$ and the point $T_{MC}$, $l_{M2}$ is a connecting line between the point $T_{MC}$ and the point $T_{MR}$, and $l_{M1}$ and $l_{M2}$ form the ideal weld seam contour of the generatrix, which is represented by formula (6);

$$r = \begin{cases} a_{M1}x + b_{M1} & (x < x_{TMC}) \\ a_{M2}x + b_{M2} & (x \geq x_{TMC}) \end{cases} \quad (6)$$

where, $r = a_{M1}x + b_{M1}$ and $r_{M2} = a_{M2}x + b_{M2}$ are respectively expressions of $l_{M1}$ and $l_{M2}$; and $x_{TMC}$ is the middle position of the left and right boundaries;

due to errors in robot processing, and in order to avoid damage to the inner wall, generating a processing contour parallel to the ideal weld seam contour at a certain safe distance $\delta$ upward; discretizing the processing contour into processing points, generating a G code, and carrying out coarse grinding to a cylindrical shell inner weld seam;

step 5: second weld seam contour measurement and fine grinding parameter control after the coarse grinding is completed, using the laser scanner (3) to scan again, and changing the dwell time of a flap wheel to realize grinding amount control of each part of the weld seam and realize weld seam fine grinding; first, obtaining contours after coarse grinding of generatrices $(K_1, K_2, \ldots K_N)$ by laser scanner scanning; generating a grinding track of the flap wheel 7 according to ideal weld seam middle points $(T_{1C}, T_{2C}, \ldots T_{NC})$ of various generatrices in a three-dimensional space;

taking the $M^{th}$ generatrix $K_M$ as an example, setting a variable contour difference $\xi_M$ to represent the difference between the weld seam contour after coarse grinding and the ideal weld seam contour of the generatrix $K_M$, and calculating a distance $d_{Mi}$ from each point in the weld seam area to an ideal weld seam according to formula (7);

$$\begin{cases} d_{Mi} = \begin{cases} r - (a_{M1}x - b_{M1}), & x_{TML} \leq x \leq x_{TMC} \\ r - (a_{M2}x - b_{M2}), & x_{TMC} < x \leq x_{TMR} \end{cases}, \text{ where } i = 1, 2 \ldots n \\ \xi_M = \dfrac{\sum_1^n d_{Mi}}{n} \end{cases} \quad (7)$$

where, $\xi_M$ represents a weld seam contour difference of the generatrix $K_M$; n represents the quantity of points in the weld seam area of the generatrix; and $d_{Mi}$ represents a distance from an actual weld seam contour point to the ideal weld seam contour;

as the flap wheel is flexible, when used for processing the generatrix $K_M$, the flap wheel will also have a grinding influence on the area around the generatrix $K_M$; therefore, a grinding weight $\mu_i$ is introduced to represent the grinding influence of the flap wheel on the weld beam of various generatrices when used for grinding at the generatrix $K_M$; when the flap wheel is used for grinding at the generatrix $K_M$, the generatrix $K_M$ is most influenced by cutting, the value of corresponding $\mu_0$ is the largest, and the weight $\mu_i$ of each nearby generatrix is determined according to the degree of influence; obtaining a weld seam grinding dwell time coefficient $\psi_M$ at $K_M$ by weighted calculation of the weld seam contour difference $\xi_i$ of various generatrices according to formula (8):

$$\psi_M = \dfrac{\mu_0 \xi_M + \mu_1(\xi_{M-1} + \xi_{M+1}) + \mu_2(\xi_{M-2} + \xi_{M+2}) + \ldots + \mu_n(\xi_{M-n} + \xi_{M+n})}{\mu_0 + 2\mu_1 + 2\mu_2 + \ldots + 2\mu_n} \quad (8)$$

where, $\psi_M$ represents the grinding dwell time coefficient at the generatrix $K_M$; $\mu_i$ represents the grinding weight; and $\xi_i$ represents the weld seam contour difference of the generatrix $K_M$;

finally, obtaining the dwell time $t_M$ of flap wheel grinding at the generatrix $K_M$ according to formula (9);

$$t_M = \psi_M t_0 \quad (9)$$

where, $t_0$ represents unit dwell time; $\psi_M$ represents the dwell time coefficient; and $t_M$ represents the dwell time at the generatrix $K_M$;

similarly, calculating the dwell time $(t_1, t_2, \ldots t_N)$ at the generatrices $(K_1, K_2, \ldots K_N)$, generating a G code, and carrying out fine grinding to the weld seam area to complete the conformal processing of the cylindrical shell inner weld seam.

2. The method for conformal processing of the cylindrical shell inner weld seam by the special mobile robot according to claim 1, wherein the special mobile robot used in the process method is composed of a robot body unit and a measuring and grinding unit; the robot body unit is composed of motion and support mechanisms and the three-axis drive mechanism; a total of 6 motion and support mechanisms are provided, which are circumferentially and uniformly distributed at 120° intervals in a front row and a back row; a supporting force is provided by a cylinder to drive the robot to change diameter and support in a thin-walled cylindrical shell; motion and support mechanisms in the front row is equipped with a driving motor which outputs a driving force to drive the robot to walk in the cylindrical shell; the three-axis drive mechanism is composed of an axial motor, a circumferential motor and a radial motor, and is used for driving the measuring and grinding unit to move along an axial direction X, a rotating direction A and a radial direction R to meet the measurement and processing requirements of the robot in space;

the measuring and grinding unit is composed of the laser scanner, an electric spindle for coarse grinding, an electric spindle for fine grinding, an arc grinding wheel, the flap wheel and the wide-angle camera; the laser scanner used for obtaining position and contour of the inner weld seam of the cylindrical shell is installed at the front end of the measuring and grinding unit; the arc grinding wheel is driven by the electric spindle for coarse grinding, and is used for carrying out coarse grinding to the inner weld seam, removing materials and reducing reinforcement of the inner weld seam; the flap wheel is driven by the electric spindle for fine grinding, and is used for carrying out fine grinding to the inner weld seam, removing burrs and trimming shape of the contour of the inner weld seam; the wide-angle camera used for observing the current position and processing condition of the robot is installed on one side of the measuring and grinding unit.

* * * * *